United States Patent [19]

Sando et al.

[11] Patent Number: 4,457,145
[45] Date of Patent: Jul. 3, 1984

[54] APPARATUS FOR TREATING A TEXTILE PRODUCT CONTINUOUSLY WITH THE USE OF LOW-TEMPERATURE PLASMA

[75] Inventors: Yoshikazu Sando; Hiroshi Ishidoshiro; Matsuo Minakata, all of Wakayama; Tokiyu Goto, Nara, all of Japan

[73] Assignee: Sando Iron Works Co., Ltd., Wakayama, Japan

[21] Appl. No.: 479,961

[22] Filed: Mar. 29, 1983

[51] Int. Cl.³ .............................................. D06B 3/12
[52] U.S. Cl. .......................................... 68/5 E; 8/444;
118/50.1; 118/718; 118/723; 219/121 P; 427/38
[58] Field of Search ................... 68/5 D, 5 E; 8/149.2, 8/444; 427/38, 39; 118/50.1, 718, 723; 204/298; 34/36, 92; 219/121 P, 121 PY, 121 PD, 121 PE, 121 PF, 121 PG

[56] References Cited

U.S. PATENT DOCUMENTS

| | | | |
|---|---|---|---|
| 3,823,489 | 7/1974 | Boom | 68/5 E X |
| 4,094,722 | 6/1978 | Yamamoto et al. | 204/298 X |
| 4,104,019 | 8/1978 | Smith | 8/444 |
| 4,262,631 | 4/1981 | Kubacki | 427/39 X |
| 4,292,384 | 9/1981 | Straughan et al. | 219/129 PD X |

Primary Examiner—Philip R. Coe
Attorney, Agent, or Firm—Toren, McGeady and Stanger

[57] ABSTRACT

An apparatus for treating a textile product continuously with the use of low-temperature plasma comprising; a reactor provided with a seal mechanism for maintaining vacuum therein while allowing a textile product to pass therethrough continuously into and out of the reactor, a plurality of guide rolls provided in the reactor for forming a passage for transporting the textile product in zigzag forming snaky undulations therethrough, and a plurality of pairs of electrode plates spacedly provided in the reactor with the textile product passage located therebetween, a plurality of gas nozzles for supplying a gas for producing low-temperature plasma to the gaps between the electrode plates, a vacuum mechanism for producing vacuum in the interior of the reactor, and means for supplying a high frequency electric wave to the electrode plates to produce low-temperature plasma therebetween. Due to the effect of low-temperature plasma, a textile product can eminently be treated with the use of limited amounts of treating agent, heat energy and water resource.

1 Claim, 2 Drawing Figures

APPARATUS FOR TREATING A TEXTILE PRODUCT CONTINUOUSLY WITH THE USE OF LOW-TEMPERATURE PLASMA

BACKGROUND OF THE INVENTION

The present invention relates to an apparatus for treating a textile product such as a cloth, string and yarn continuously with the use of low-temperature plasma.

For treating, for instance desizing and scouring, a textile product such as a cloth produced industrially, the textile product has usually been wet-heat treated by using large quantities of a specified agent, heat and water resources under high or normal pressure. To describe an example of well-known pretreatment of a cloth practically, a cloth to be treated is soaked with a treating solution containing caustic alkali and a penetrating agent, steamed in a reactor under high or normal pressure for a certain period to complete the pretreatment, washed with water repeatedly to remove the agent used and foreign matters adhering to the cloth, and dried by passing the cloth through a dryer to complete the pretreatment.

However, it is the present status in such a treating process that a costly treating agent is necessitated, a large amount of heat is necessary for the reaction between the agent and the cloth, and a large size washing machine and a large amount of water are needed for removing the treating agent and foreign matters from the cloth, thus consuming large quantities of water resource and heat energy uneconomically. Moreover, since waste water from the washing machine contains unavoidably the treating agent, causing the problem of public pollution, its treatment needs large installation cost and personnel expenses.

SUMMARY OF THE INVENTION

Under such circumstances, the object of the present invention is to offer an apparatus for the treatment, such as pretreatment, of a textile product, such as a cloth, string and yarn, continuously with the use of possibly small amounts of heat energy and water resource by utilizing the effect of low-temperature plasma applied to the textile product.

The principle of the invention is to apply low-temperature plasma to a textile product to be treated while the textile product is passing in zigzag forming snaky undulations through a reactor under vacuum.

DETAILED DESCRIPTION OF THE PREFERRED EMBODIMENTS

Preferred embodiments of the invention will be described in detail in the following with reference to the attached drawings. The description is for the treatment of a long cloth.

Figure 1:
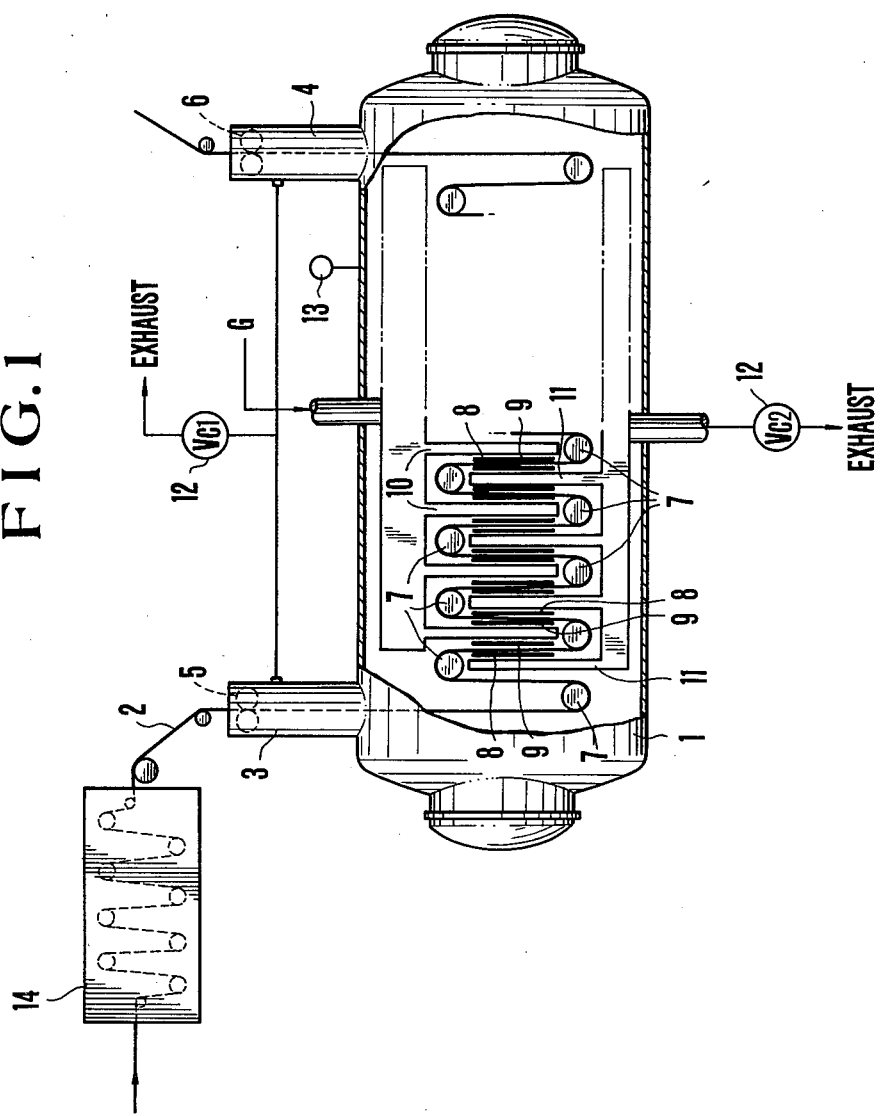
FIG. 1 is a sectional side view of an example of the present inventive apparatus.

In FIG. 1, 1 is a reactor, and the reactor 1 is provided with a cloth inlet 3 for taking a cloth to be treated 2 continuously in the reactor and a cloth outlet 4 for taking the cloth continuously out of the reactor. The cloth inlet 3 and the cloth outlet 4 are provided respectively with seal mechanisms 5 and 6 so as to transport the cloth continuously through the reactor while maintaining the interior of the reactor vacuum. As for the seal mechanisms 5 and 6, any one disclosed by the present inventors may be applied selectively.

Figure 2:
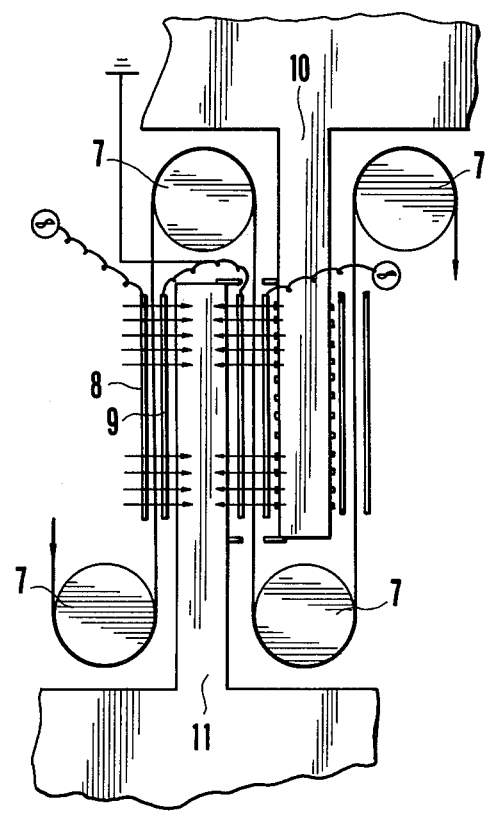
FIG. 2 is an enlarged partial view thereof.

7 are a plurality of cloth guide rolls provided up and down in zigzag in two stages in the reactor 1 to form cloth passages for transporting the cloth 2 in zigzag forming snaky undulations therethrough. 8 and 9 are a plurality of electrode plates provided in the reactor 1 by putting the cloth passages therebetween. The electrode plates at one side 8 are connected to an oscillator (not shown in the drawing) for supplying high frequency electric wave to the electrodes, and the other side electrode plates 9 are earthed. The electrode plates 8 and 9 are made of such materials as a metal gauze and a porous metal plate for distributing a gas for producing low-temperature plasma uniformly all over the electrode plates. 10 are gas nozzles provided comblikely adjacently to the electrode plates at one side (positive side) 8 for jetting a gas such as air, oxygen and argon through the electrode plates to the cloth for producing low-temperature plasma. 11 are gas exhaust ducts provided also comblikely as in the gas nozzles 10 at the position opposite to the gas nozzles 10 by putting the electrode plates 8 and 9 and the cloth passage 2 therebetween. 12 is a vacuum pump, 13 is a vacuum meter and 14 is a drying machine. The essential parts of the apparatus can more distinctly be seen from FIG. 2.

The construction of the apparatus in this example is as described above. Now, its functions will be described in the following.

At first, the vacuum pump 12 is driven for controlling the vacuum degree of the interior of the reactor 1 to 0.6 to 0.7 Torr, then air, oxygen or other gas for producing low-temperature plasma is supplied from the gas nozzles 10 into the reactor 1 to control the vacuum degree of the interior of the reactor 1 to about 1 Torr, and high frequency electric wave with a frequency of, for instance, 13.56 MHz is supplied from the oscillator (not shown in the drawing) to the electrode plates for producing low-temperature plasma. By driving the guide rolls 7, a cloth to be treated is dried by passing the dryer 14 and transported through an atmosphere of the low-temperature plasma thus produced as well as the gas excited by the plasma between the electrode plates 8 and 9. The greater part of sizing agent (for instance, polyvinyl alcohol) adhering to the fibers of the cloth 2 is directly oxidized with the radiation of low-temperature plasma, and thus desizing of a cloth as an aimed pretreatment can be done eminently. The quality of the gas for producing low-temperature plasma and the radiation time of the plasma are selected freely according to the quantity of the cloth to be treated and the object of the treatment. The reason why a cloth is dried previously in the drying machine 14 is to maintain the interior of the reactor 1 to a good vacuum state.

As described in detail in the above, the present invention is to apply low-temperature plasma to a textile product to be treated while the textile product is passing in zigzag forming snaky undulations through a reactor under vacuum. Due to the effect of low-temperature plasma, treatment of a textile product such as pretreatment including desizing and scouring can be done with the use of limited amounts of treating agent, heat energy and water resource economically and without causing the problem of public pollution. Particularly, the present inventive apparatus is to repeat the radiation of low-temperature plasma to be textile product while the textile product is passing through a plurality of electrode plates in zigzag forming snaky undulations, so that the radiation of the plasma to the textile product can be done effectively and sufficiently for quickening the transporting speed of the textile product and thus increasing the productivity.

In the above-mentioned example, the low-temperature plasma is produced in the reactor adjacent to the textile product passing through the textile product passages, but low-temperature plasma produced outside the reactor by a suitable means can be applied for the treatment of a textile product in the present invention, and such a procedure is particularly suitable for such purposes as to improve the fixability of a dye to a textile product, to subject a textile product to shrink resistant finish, and further as the treatment of yarns.

What we claim:

1. An apparatus for treating a textile product continuously with the use of low-temperature plasma comprising; a reactor provided with an inlet and an outlet, an inlet seal mechanism and an outlet seal mechanism for maintaining vacuum within the reactor while allowing a textile product to pass continuously into, through, and out of the reactor, a plurality of guide rolls provided in the reactor for forming a passage for transporting the textile product through the reactor in a zigzag manner thereby forming snaky undulations of the material, and a plurality of pairs of electrode plates spacedly provided in the reactor with the textile product passage located between the plates of each pair, a plurality of gas nozzles within the reactor for supplying a gas for producing low-temperature plasma to the spaces between respective pairs of the electrode plates, a vacuum mechanism for producing vacuum in the interior of the reactor, and means for supplying a high frequency electric wave to each pair of the electrode plates to produce low-temperature plasma between the plates of each pair.

* * * * *